United States Patent
Norberg

(10) Patent No.: US 8,659,598 B1
(45) Date of Patent: Feb. 25, 2014

(54) ADJUSTING NAVIGABLE AREAS OF A VIRTUAL SCENE

(75) Inventor: Jonas Nils Norberg, San Francisco, CA (US)

(73) Assignee: Lucasfilm Entertainment Company Ltd., San Francisco, CA (US)

( * ) Notice: Subject to any disclaimer, the term of this patent is extended or adjusted under 35 U.S.C. 154(b) by 679 days.

(21) Appl. No.: 12/914,170

(22) Filed: Oct. 28, 2010

(51) Int. Cl.
*G06T 15/30* (2011.01)

(52) U.S. Cl.
USPC ............ 345/423; 345/418; 701/400; 701/301

(58) Field of Classification Search
USPC ........... 345/418, 419, 433, 423; 701/301, 400
See application file for complete search history.

(56) References Cited

U.S. PATENT DOCUMENTS

| | | | | |
|---|---|---|---|---|
| 6,359,630 B1* | 3/2002 | Morse et al. | ................... | 345/620 |
| 7,440,447 B2* | 10/2008 | Kareev et al. | ................. | 370/359 |
| 8,203,561 B2* | 6/2012 | Carter et al. | ................... | 345/475 |
| 2003/0058238 A1* | 3/2003 | Doak et al. | ..................... | 345/419 |
| 2003/0109296 A1* | 6/2003 | Leach et al. | ........................ | 463/6 |
| 2004/0257375 A1* | 12/2004 | Cowperthwaite | ............. | 345/582 |
| 2007/0198178 A1* | 8/2007 | Trimby et al. | ................ | 701/209 |

OTHER PUBLICATIONS

Tonks, Matt, http://web.archive.org/web/20100210164429/http://udn.epicgames.com/Three/NavigationMeshReference.html Feb. 10, 2010.*
Tonks, Matt, http://web.archive.org/web/20091224124903/http://udn.epicgames.com/Three/NavigationMeshTechnicalGuide.html#NavigationInterface Dec. 24, 2009.*
"Fixing Pathfinding Once and for All", Jul. 26, 2008, http://www.ai-blog.net/archives/000152.html.*
"Navpower: Leading-edge AI Motion Planning." [on-line] http://www.navpower.com/technology.html, accessed Oct. 28, 2010, 2 pages.

* cited by examiner

*Primary Examiner* — Michelle L Sams
(74) *Attorney, Agent, or Firm* — Kilpatrick Townsend & Stockton, LLP

(57) ABSTRACT

A system includes a computing device that includes a memory configured to store instructions. The computing device also includes a processor configured to execute the instructions to perform a method that includes identifying one or more convex polygons being adjacent to a virtual object introduced into a virtual scene. The one or more convex polygons define a navigable area within the virtual scene. The method also includes redefining the one or more convex polygons adjacent to the virtual object to adjust the navigable area for the introduction of the virtual object. Redefining the one or more convex polygons uses Boolean operations and allows aligned perimeters of adjacent convex polygons to use unshared vertices.

27 Claims, 8 Drawing Sheets

ADJUSTING NAVIGABLE AREAS OF A VIRTUAL SCENE

TECHNICAL FIELD

This document relates to adjusting the navigable areas of a virtual scene such as a video game scene.

BACKGROUND

Striving to present realistic viewing experiences, the level of detail provided by virtual environments such as video games has become computationally complex and call for more and more computing resources. For example, viewers have grown to expect imagery of near photographic quality and audio comparable to studio quality. Along with being provided such high quality sensory input, viewers have come to expect a seamless viewing experience while moving throughout the virtual environment, e.g., controlling movements of a virtual character during game play.

SUMMARY

The systems and techniques described here relate to redefining the navigable area of a virtual scene based upon changes in the scene.

In one aspect, a computer-implemented method includes identifying one or more convex polygons being adjacent to a virtual object introduced into a virtual scene. The one or more convex polygons define a navigable area within the virtual scene. The method also includes redefining the one or more convex polygons adjacent to the virtual object to adjust the navigable area for the introduction of the virtual object. Redefining the one or more convex polygons uses Boolean operations and allows aligned perimeters of adjacent convex polygons to use unshared vertices.

Implementations may include any or all of the following features. Redefining the one or more convex polygons adjacent to the virtual object may include replacing each convex polygon with a collection of convex polygons. The collection of convex polygons may define a non-navigable portion of the navigable area that represents the introduced virtual object. Each convex polygon in the collection of convex polygons may be defined by two planes that represent adjacent sides of the virtual obstacle. The two planes may define a perimeter of at least one convex polygon in the collection of convex polygons. Boolean operations may subtract at least one convex polygon in the collection of convex polygons from one of the convex polygons adjacent to the virtual object. The virtual scene may be a portion of a virtual environment. The identifying and redefining may occur when the virtual object is introduced into the virtual scene, when a virtual character enters the virtual scene, or another similar event.

In another aspect, a computer-implemented method includes, upon a virtual object being introduced into a virtual scene, identifying a portion of a navigation mesh that is adjacent to the introduced object. The navigation mesh represents an area navigable by a character within the virtual scene. The method also includes redefining the portion of the navigation mesh adjacent to the introduced virtual object to include a navigable area portion defined by convex polygons and a non-navigable area portion that represents the location of the introduced virtual object. Redefining the portion of the navigation mesh includes using Boolean operations and allowing aligned perimeters of adjacent pairs of the convex polygons to use unshared vertices. The method also includes controlling the movements of the character within the virtual scene by allowing character movements within the navigable area portion and blocking character movements within the non-navigable area portion.

In another aspect, a computer program product tangibly embodied in an information carrier and comprising instructions that when executed by a processor perform a method that includes identifying one or more convex polygons being adjacent to a virtual object introduced into a virtual scene. The one or more convex polygons define a navigable area within the virtual scene. The method also includes redefining the one or more convex polygons adjacent to the virtual object to adjust the navigable area for the introduction of the virtual object. Redefining the one or more convex polygons uses Boolean operations and allows aligned perimeters of adjacent convex polygons to use unshared vertices.

Implementations may include any or all of the following features. Redefining the one or more convex polygons adjacent to the virtual object may include replacing each convex polygon with a collection of convex polygons. The collection of convex polygons may define a non-navigable portion of the navigable area that represents the introduced virtual object. Each convex polygon in the collection of convex polygons may be defined by two planes that represent adjacent sides of the virtual obstacle. The two planes may define a perimeter of at least one convex polygon in the collection of convex polygons. Boolean operations may subtract at least one convex polygon in the collection of convex polygons from one of the convex polygons adjacent to the virtual object. The virtual scene may be a portion of a virtual environment. The identifying and redefining may occur when the virtual object is introduced into the virtual scene, when a virtual character enters the virtual scene, or another similar event.

In another aspect, a computer program product tangibly embodied in an information carrier and comprising instructions that when executed by a processor perform a method that includes, upon a virtual object being introduced into a virtual scene, identifying a portion of a navigation mesh that is adjacent to the introduced object. The navigation mesh represents an area navigable by a character within the virtual scene. The method also includes redefining the portion of the navigation mesh adjacent to the introduced virtual object to include a navigable area portion defined by convex polygons and a non-navigable area portion that represents the location of the introduced virtual object. Redefining the portion of the navigation mesh includes using Boolean operations and allowing aligned perimeters of adjacent pairs of the convex polygons to use unshared vertices. The method also includes controlling the movements of the character within the virtual scene by allowing character movements within the navigable area portion and blocking character movements within the non-navigable area portion.

In another aspect, a system includes a computing device that includes a memory configured to store instructions. The computing device also includes a processor configured to execute the instructions to perform a method that includes identifying one or more convex polygons being adjacent to a virtual object introduced into a virtual scene. The one or more convex polygons define a navigable area within the virtual scene. The method also includes redefining the one or more convex polygons adjacent to the virtual object to adjust the navigable area for the introduction of the virtual object. Redefining the one or more convex polygons uses Boolean operations and allows aligned perimeters of adjacent convex polygons to use unshared vertices.

Implementations may include any or all of the following features. Redefining the one or more convex polygons adjacent to the virtual object may include replacing each convex polygon with a collection of convex polygons. The collection of convex polygons may define a non-navigable portion of the navigable area that represents the introduced virtual object. Each convex polygon in the collection of convex polygons may be defined by two planes that represent adjacent sides of the virtual obstacle. The two planes may define a perimeter of at least one convex polygon in the collection of convex polygons. Boolean operations may subtract at least one convex polygon in the collection of convex polygons from one of the convex polygons adjacent to the virtual object. The virtual scene may be a portion of a virtual environment. The identifying and redefining may occur when the virtual object is introduced into the virtual scene, when a virtual character enters the virtual scene, or another similar event.

In another aspect, a system includes a computing device that includes a memory configured to store instructions. The computing device also includes a processor configured to execute the instructions to perform a method that includes, upon a virtual object being introduced into a virtual scene, identifying a portion of a navigation mesh that is adjacent to the introduced object. The navigation mesh represents an area navigable by a character within the virtual scene. The method also includes redefining the portion of the navigation mesh adjacent to the introduced virtual object to include a navigable area portion defined by convex polygons and a non-navigable area portion that represents the location of the introduced virtual object. Redefining the portion of the navigation mesh includes using Boolean operations and allowing aligned perimeters of adjacent pairs of the convex polygons to use unshared vertices. The method also includes controlling the movements of the character within the virtual scene by allowing character movements within the navigable area portion and blocking character movements within the non-navigable area portion.

Details of one or more implementations are set forth in the accompanying drawings and the description below. Other features, aspects and advantages will be apparent from the description and drawings, and from the claims.

DETAILED DESCRIPTION

Figure 1:
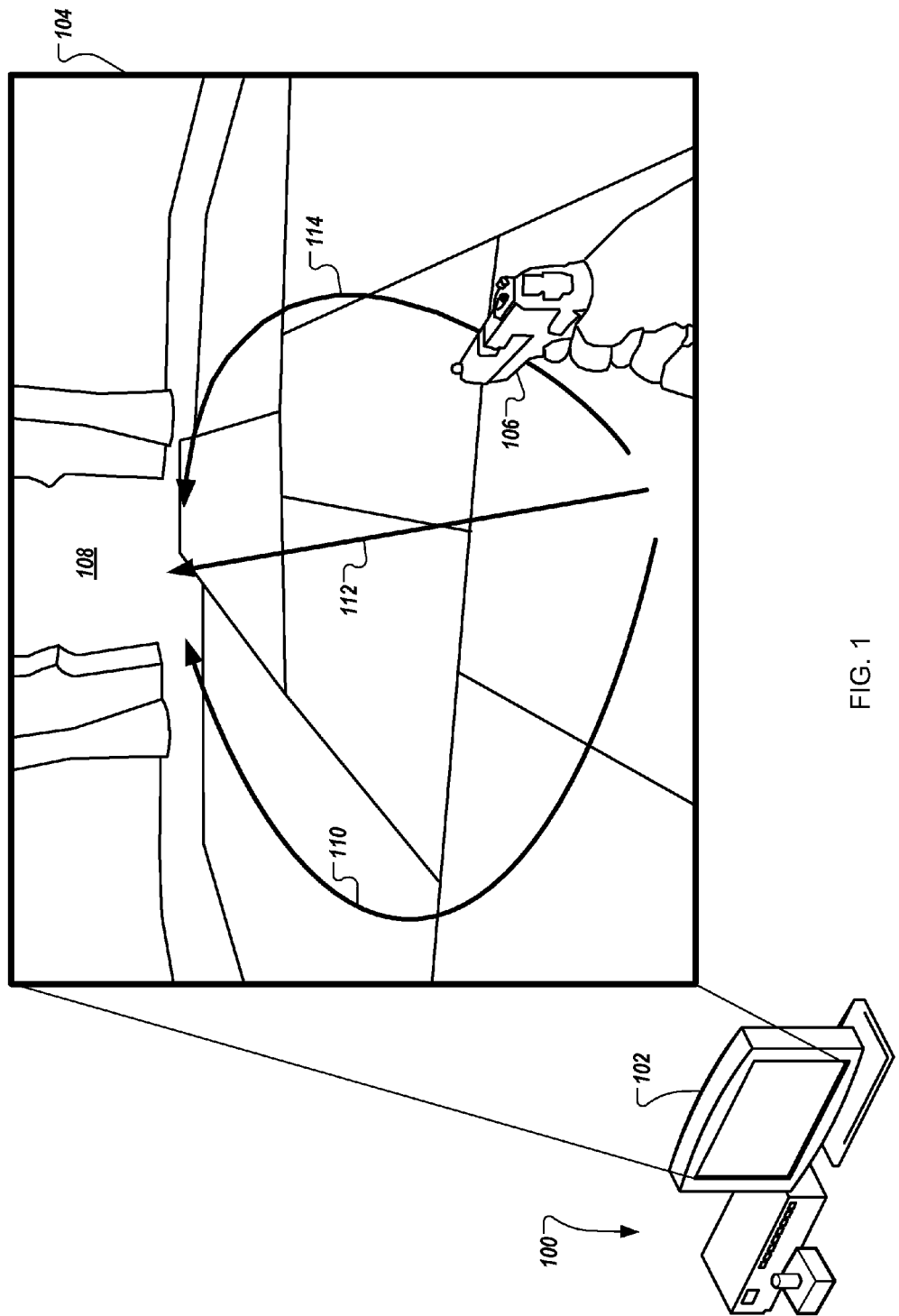
FIG. 1 illustrates an exemplary virtual scene.

Referring to FIG. 1, a computing device 100 (e.g., a video game console) is illustrated as presenting (on a display 102) a scene 104 from a virtual environment (e.g., a video game title) that gives the player a viewing perspective of a virtual character (e.g., included in the game). In this instance, the virtual character is carrying a weapon 106 and looking across the flooring of a virtual room towards an opening 108 that may be used to enter or exit the room. With the floor clear of obstructions, numerous routes may be taken (e.g., as controlled by the viewer, artificial intelligence, etc.) to move the character across the room and to the opening 108. To illustrate, three arrows 110, 112 and 114 graphically represent three different paths (e.g., swing in from the left, straight forward move, swing in from the right) that may be traveled by the character. Such path options are governed by the virtual environment (e.g., the video game title) by implementing one or more techniques. For example, the navigable area of a virtual scene may be controlled to constrain character movement (e.g., so a character does not appear to walk through a wall, etc.). A mesh (e.g., referred to as a navigation mesh) or other type of mathematical representation may be used to represent the area of the scene that may be navigated by a character. Venturing off the navigable area, the travel of a character may be blocked. For example, one boundary of a navigation mesh associated with the virtual room may correspond to the location of a wall. Upon reaching this boundary, forward progress of the character would be halted. As such, along with defining the area of a virtual scene that may be navigated, a navigation mesh also defines the boundaries to character movement. For scenarios in which the virtual scene is static (e.g., walls are fixed, etc.) the navigable area remains constant. However, the navigable area may be dynamic in some situations that include obstructions changing over time (e.g., moving walls, introducing virtual obstacles, etc.).

Figure 2:
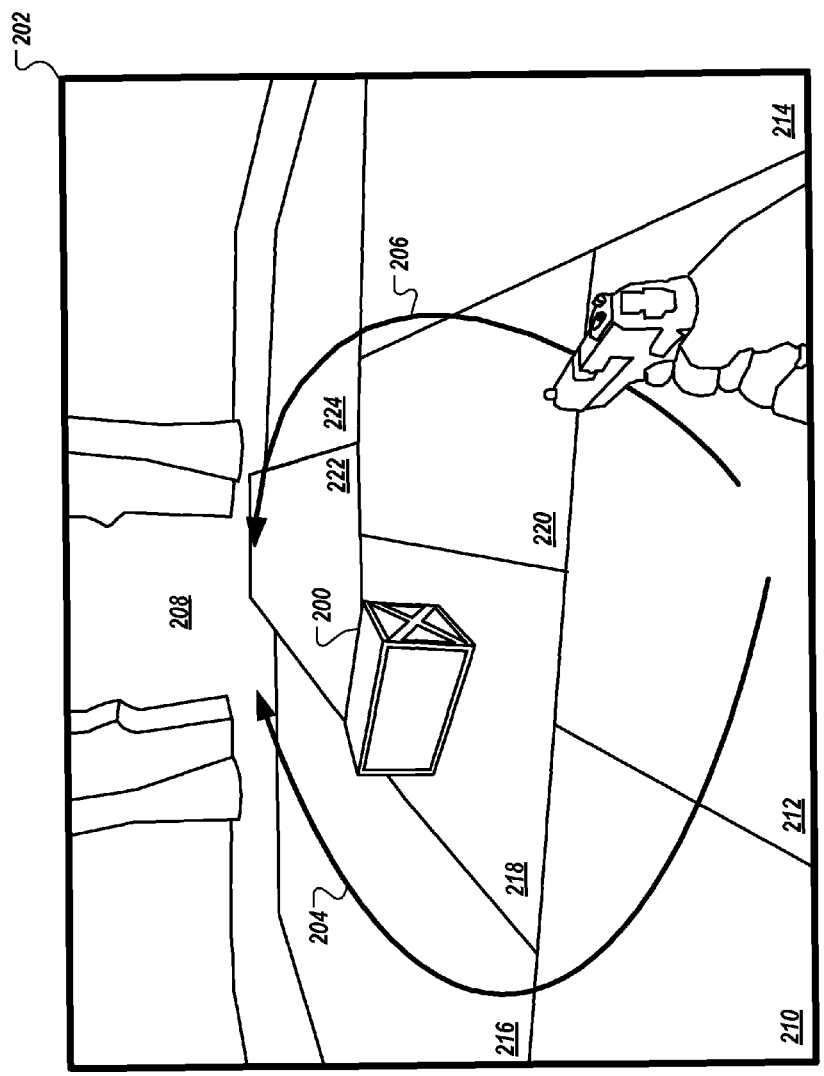
FIG. 2 illustrates a virtual obstacle changing the navigable area of the virtual scene.

Referring to FIG. 2, a virtual obstacle (e.g., a virtual crate 200) is introduced into a virtual scene 202 (that is similar to the scene 104 of FIG. 1) and thereby changes the possible paths that may be traveled by the character. For example, assuming that the character can not leap over the crate 200, the character is constrained to moving to the left (as represented by arrow 204) or moving to the right (as represented by arrow 206) to traverse the floor of the virtual scene 202 and reach an opening 208 (e.g., to move into another virtual room). Based upon the introduction of the virtual crate 200, which may be dramatic (e.g., dropped into place as the character enters the scene), the navigable area of the scene needs to be redefined to constrain the character to navigable paths (e.g., not allow the character to walk through the crate 200). Along with introducing an obstacle, one or more similar events (e.g., multiple crates appearing, moving walls, opening trap doors, etc.) may occur in a somewhat rapid manner and call for adjustments to the navigable area of the scene. As such, computationally efficient adjustments to the navigable area may be needed that allow a character to interact with the scene without significant delays and causing distractions to the viewing experience.

One or more techniques or methodologies may be implemented to adjust the navigable area of a virtual scene to account for changing conditions (e.g., the introduction of a virtual obstacle, etc.) of the scene. In one arrangement, a navigation mesh may be represented as a collection of polygons that are topologically connected (e.g., connected polygons share an edge). For demonstrative purposes, in the figure a navigation mesh is represented in the virtual scene 202 as a collection of rectangular shaped polygons 210, 212, 214, 216, 218, 220, 222, 224. For ease of illustration, the polygons 210-224 are shown as corresponding to the floor tiles of the scene, however, such a navigation mesh may take other forms. For example, other polygon shapes may be used to define a navigation mesh, though convex shapes are typically used since any straight line between two vertices included in a convex shape remain within or on the boundary of the polygon, thereby allowing relatively simpler tracking of character movements. Other types of convex polygon shapes may be used (e.g., triangular-shaped polygons) independently or in combination (e.g., rectangular and triangular shaped polygons).

Conventional techniques typically connect the navigation mesh polygons such that common edges of two adjacent polygons are shared and the connections (between adjacent polygons) are substantially free of gaps and overlaps. Complying to such constraints, the meshes (e.g., referred to as being "water-tight" meshes) could be used for detail-oriented applications such as rendering graphics of the virtual scene. However, upon a virtual obstacle (or multiple obstacles) being introduced, one or more polygons of such navigation meshes may need redefining to account for the newly occupied area of the obstacle that may no longer be navigable by a character. For example, the polygon (or polygons) upon which the introduced obstacle is positioned is typically redefined to account for the reduced navigable area. Such a refinement, referred to as re-triangulation, can be complex and computationally intensive. Further complexity may be added if the resulting navigation mesh is to be "water-tight" compliant.

To define the navigable area of a scene, navigation meshes do not need to be "water-tight" (e.g., since such meshes do not need the level of detail as meshes used for rendering graphics) and such geometrical constraints may be relaxed. For example, slight separation gaps between polygons, overlapping of polygons, aligned polygon edges not sharing vertices, etc. may be tolerable to define a navigable area. Further, by relaxing topological connectivity among the convex polygons, computationally efficient and less complex operations may be used. For example, Boolean operations may be used to efficiently redefine polygons of a navigation mesh to quickly apply adjustments and account for one or more introduced obstacles. In situations in which such obstacles are introduced during run time (e.g., as the character enters or moves about a scene of a video game title), such efficient operations may reduce delays in game play along with the presenting of visual distractions.

Figure 3:
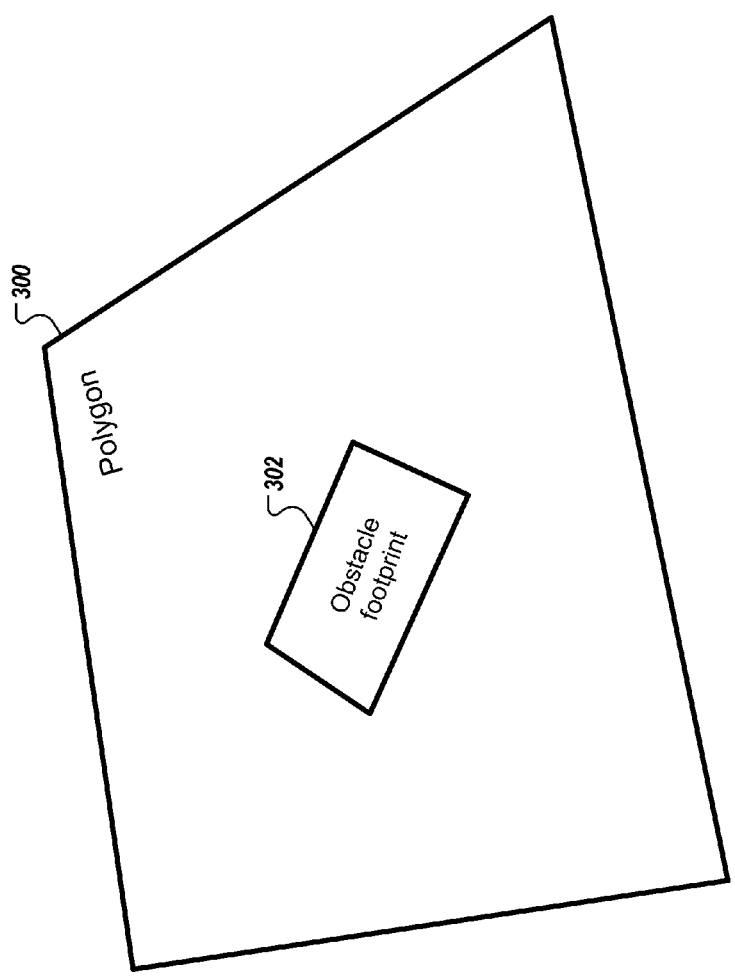
FIG. 3-6 illustrates a technique to redefine polygons for adjusting the navigable area of the virtual scene.

Referring to FIG. 3, a rectangular shaped convex polygon 300 (similar to the polygon 218 shown in FIG. 2) is included in a navigation mesh. Typically a navigation mesh (e.g., for a virtual room, game level, etc.) includes a collection of similarly shaped polygons to define the navigable area within which a character may travel. However, for ease of demonstration, in this example, the entire navigation mesh is considered to be the convex polygon 300. To represent the introduction of an obstacle (e.g., a crate such as the crate 200 shown in FIG. 2), a polygon 302 represents the projected footprint of the obstacle onto the convex polygon 300. Based upon the introduction of the obstacle (e.g., the crate dropped into the virtual scene), a character (e.g., a video game character) should be constrained from traveling across any portion of the footprint 302 (e.g., so the character does not appear to walk through the obstacle during game play). As such, the footprint 302 should be removed from the area of the polygon 300. However, once removed, the polygon 300 is no longer convex and correspondingly needs to be redefined for tracking character movements and to account for this area reduction.

One or more techniques may be implemented for modifying a navigation mesh (represented by one or more convex polygons) to account for the footprint of a newly introduced obstacle. For example, each convex polygon affected by the obstacle may be redefined with one or more convex polygons that account for the area consumed by the introduced virtual obstacle. Further, by relaxing constraints that redefined polygons be "water-tight", less computationally intensive operations such as Boolean operations may be utilized. In one arrangement, edges of the obstacle footprint may be used to define cutting planes to produce one or more convex polygons for replacing the polygon that the obstacle (or a portion of the obstacle) has been positioned upon.

Figure 4:
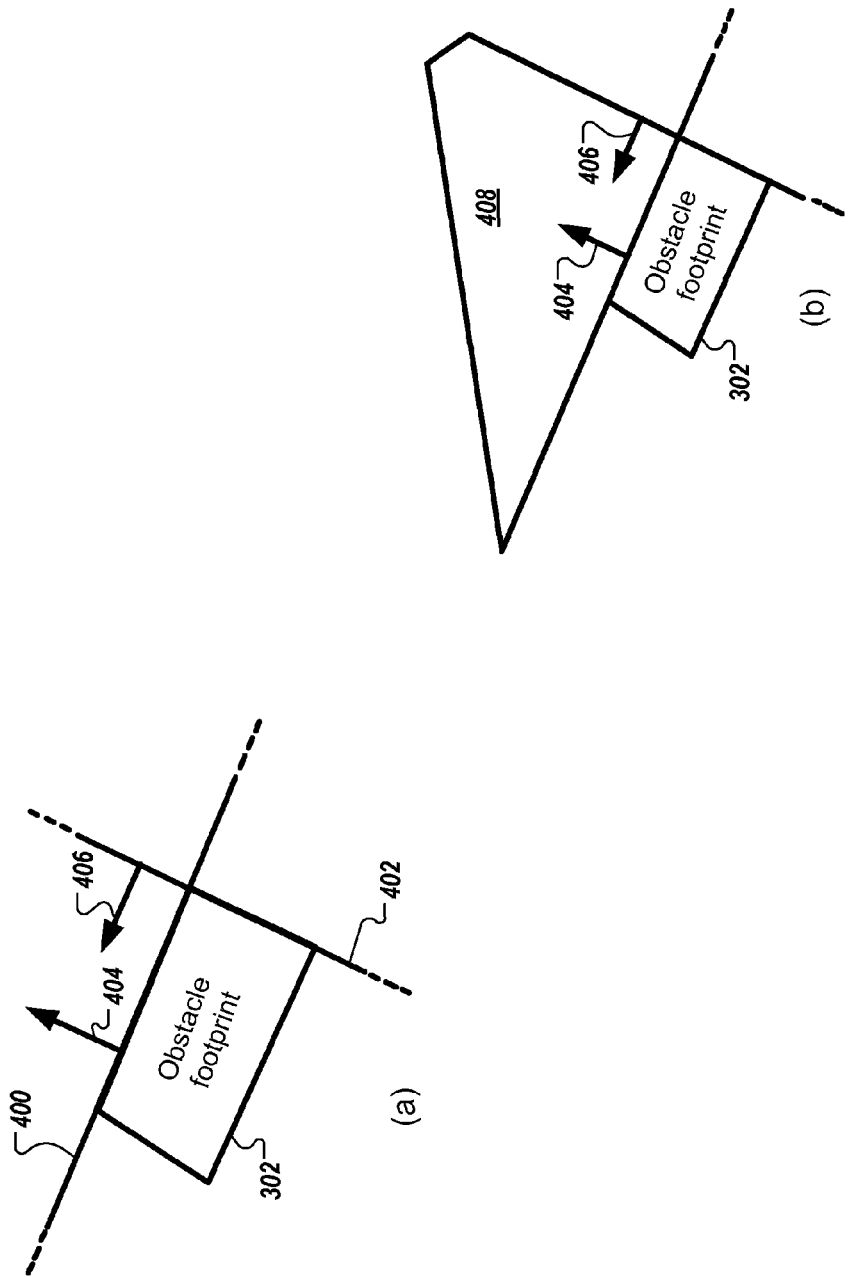

Referring to FIG. 4(a), two planes are defined such that each is parallel to one of two adjacent edges of the obstacle footprint 302 (from FIG. 3). By extending the planes along the polygon (e.g., the polygon 300 of FIG. 3.) two sides are defined and Boolean operations can be used to produce a convex polygon from the original polygon (upon which the obstacle is positioned). For example, Boolean operations may be used to subtract a new convex polygon (defined by the cutting planes) from the original polygon (e.g., polygon 300). Stepping around the perimeter of the obstacle footprint 302, additional convex polygons may be defined from other adjacent pairs of edges of the footprint and Boolean operations to account for the introduction of the obstacle. Once defined, the convex polygons may be combined to provide a navigation mesh portion (or complete navigation mesh, for this example) that block a character from traveling through the area occupied by the virtual obstacle.

In this particular example, two planes (represented as lines 400 and 402) are produced that extend (in both directions) parallel along two respective adjacent sides of the obstacle footprint 302. For each plane a cutting direction is selected to define the portion of the polygon (e.g., polygon 300) to be retained and the portion to be discarded. Various conventions may be used for defining such cutting directions for each plane. For example, as illustrated, one cutting direction may be selected as extending outward (as represented by normal vector 404) from the plane 400 and the cutting direction for the other plane 402 may be selected as extending inward (as represented by the normal vector 406). As shown in FIG. 4(b), based on the cutting directions represented by the normal vectors 404, 406, Boolean operations may be used to subtract the retained portion from the polygon 300 and produce a convex polygon 408. In a similar manner, convex polygons may be produced by using other pairs of adjacent sides of the obstacle footprint 302 for defining corresponding convex polygons that when combined account for the introduction of the obstacle.

Figure 5:
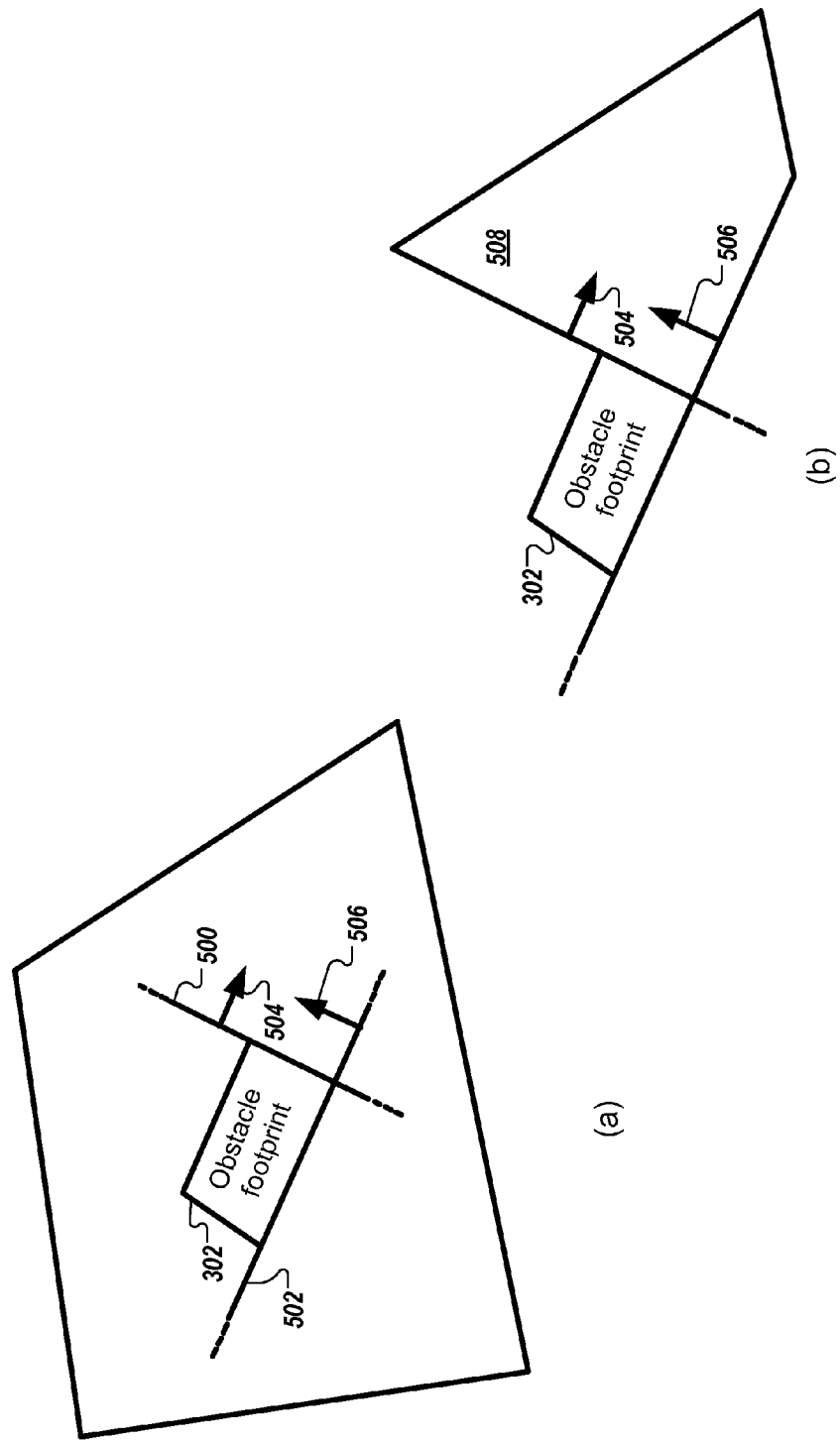

Referring to FIG. 5(a), the next pair of adjacent sides of the obstacle footprint 302 (represented by planes 500 and 502) are selected. In this particular example, the pair of adjacent sides are selected by stepping in a clockwise direction around the perimeter of the obstacle footprint 302, however, other selection conventions may be implemented. Similar to defining the convex polygon 408, complementary cutting directions are defined for each of the planes 500, 502 for identifying portions to be retained and discarded. In particular, a normal vector 504 points outward from the plane 500 (similar to the cutting direction defined by the normal vector 404) and a normal vector 506 points inward (similar to the cutting direction defined by the normal vector 406). Extending the normal vectors 504, 506 in their respective directions to the boundaries of the polygon 300, another convex polygon 508 is defined as illustrated in FIG. 5(b). As shown in the figure, the convex polygon 508 is bounded by the planes 500, 502 and the edges of the polygon 300 as identified by the normal vectors 504, 506. Similar to the convex polygon 408, Boolean operations may be used to subtract the identified area from the polygon 300 and produce the convex polygon 508.

Continuing around the perimeter of the obstacle footprint 302 (e.g., in a clockwise manner), two additional pairs of adjacent sides of the obstacle footprint 302 can be identified and used to produce similar convex polygons. By using Boolean operations, the respective convex polygons may be subtracted from the polygon 300. The four defined convex polygons, including polygons 408 and 508, can be combined to produce a collection of convex polygons that redefine the polygon 300 and account for the introduction of the obstacle (represented with the footprint 302).

Figure 6:
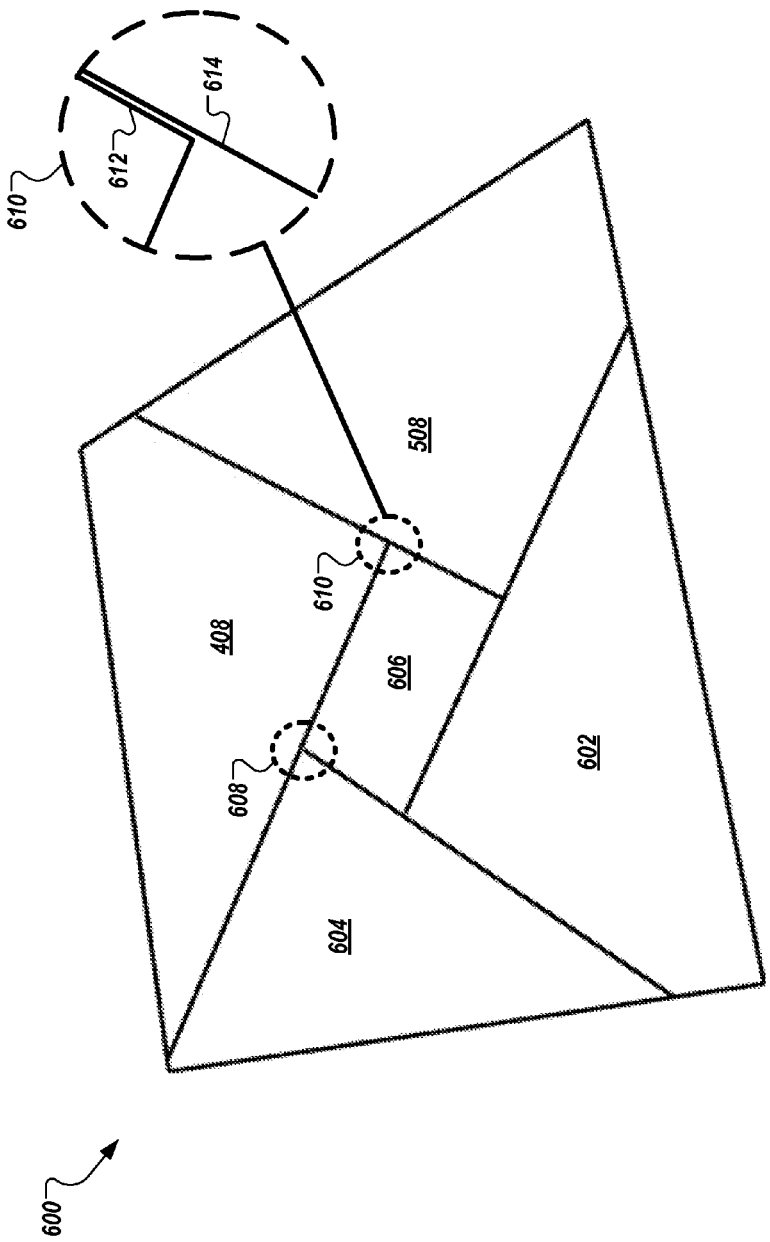

Referring to FIG. 6, a collection of convex polygons 600 is presented that redefine the polygon 300 (shown in FIG. 3) and that account for the area occupied by the obstacle positioned upon the polygon. In particular, the collection 600 includes the convex polygons 408, 508 produced from the technique respectively illustrated in FIG. 4 and FIG. 5. Additionally, the collection includes convex polygons 602 and 604 that are defined in a similar manner by using the remaining two pairs of adjacent sides of the obstacle footprint 302 (shown in FIG. 3). By accounting for the obstacle footprint, the collection of convex polygons 600 define a navigation mesh that includes a gap 606 that represents the area that is no longer navigable (e.g., by a character during game play). In this particular arrangement, four convex polygons are used to form the collection 600, however, additional polygons may be used to some arrangements. However, in some scenarios, a minimum size for each convex polygon may be defined such that polygons sized below this minimum threshold are discarded from the collection.

By relaxing the constraints on the convex polygons included in the collection 600, adjacent polygons may not be required to share vertices. For example, a corner that defines one convex polygon may not be commonly shared with another corner that defines another convex polygon. As illustrated in the figure, a corner of the convex polygon 604 (highlighted by dashed-line circle 608) shares an edge of convex polygon 408 (rather than one of the four corners that define the convex polygon 408). Also relaxing constraints may allow gaps to be present between adjacent convex polygons. For example, a corner of the convex polygon 408 (highlighted by dashed-line circle 610) may not completely extend to intersect the edge of convex polygon 508. As illustrated in the expanded view of dashed-line circle 610, a line 612 that defines the corner of the convex polygon 408 may not extend onto and be shared with a corresponding line 614 that defines the convex polygon 614. Such a gap may be noticeable if the convex polygon collection 600 was used for rendering graphics, however, to define a navigation mesh for character movements, such relatively small gaps may be tolerable.

Similar to redefining a single polygon to account for the introduction of one or more obstacles, multiple polygons, which represent a navigation mesh may be redefined to account for one or more obstacles. For example, two adjacent polygons (which define a navigation mesh or a portion of a mesh) may be redefined to account for an obstacle whose footprint straddles both polygons. Each polygon may be independently redefined by a collection of convex polygons that define a gap that represents the portion of the obstacle residing on the corresponding polygon. Once each polygon has been redefined by convex polygon collections, the collections may be further processed to produce an adjusted navigation mesh. For example, the collections may be re-evaluated such that each is alerted to the presence of the other for recombination. Other processes may also be executed for combining the collections to produce a navigation mesh.

Figure 7:
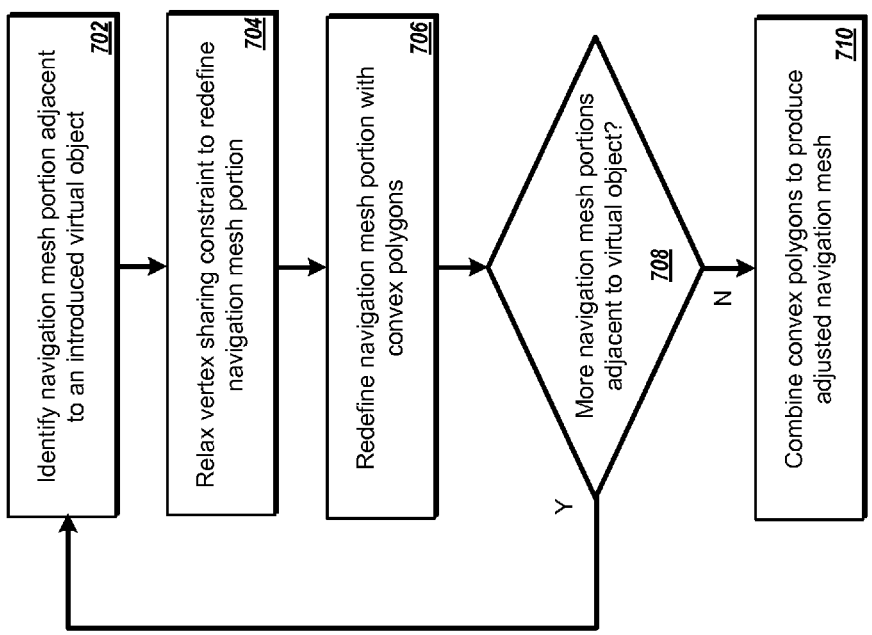
FIG. 7 is an exemplary flow chart of operations for adjusting a navigable area of a virtual scene.

Referring to FIG. 7, a flowchart 700 represents operations of a computing device such as the video game console 100 to adjust a navigation mesh associated with a scene of a virtual environment (e.g., a video game title). Such operations are typically executed by components (e.g., one or more processors) included in a computing device, however, operations may be executed by multiple computing devices. Along with being executed at a single site (e.g., at the location of the video game console), operations execution may be distributed among two or more locations.

Operations of the computing device may include identifying 702 a portion of a navigation mesh as being adjacent to (e.g., occupied by) a virtual object (e.g., a virtual crate) that has been introduced into a scene of a virtual environment (e.g., a video game). Such identification may occur at various instances of time, for example, upon the object arriving in the scene (e.g., simulating the object being dropped into the virtual scene) operations may be executed to identify the footprint of the object with relation to the navigation mesh. In some arrangements, identification may occur once a virtual character has entered the scene or moved to a location near the newly introduced virtual object. Operations may also include relaxing 704 constraints that regard sharing vertices among adjacent convex polygons used to redefine the navigation mesh. For example, gaps, overlaps and other types of vertex-level differences (e.g., non-watertight junctions between convex polygons) between aligned edges of two adjacent convex polygons may be allowed. Operations may also include redefining 706 the identified portion of the navigation mesh into one or more convex polygons. For example, cutting planes defined from pairs of adjacent edges of a footprint of the obstacle (projected onto the navigation mesh) may be used with Boolean operations to the define a collection of convex polygons for replacing the navigation mesh portion. Operations may also include determining 708 if another portion of the navigation mesh is adjacent to (e.g., being occupied by) the virtual object. If another portion of the mesh is affected by the object, operations may include returning to identify the mesh portion. If no additional portion of the navigation mesh is affected by the virtual object, operations may include combining 710 the convex polygons to produce an adjusted navigation mesh, e.g., that may be used to control the movements of a character within the virtual environment scene.

Figure 8:
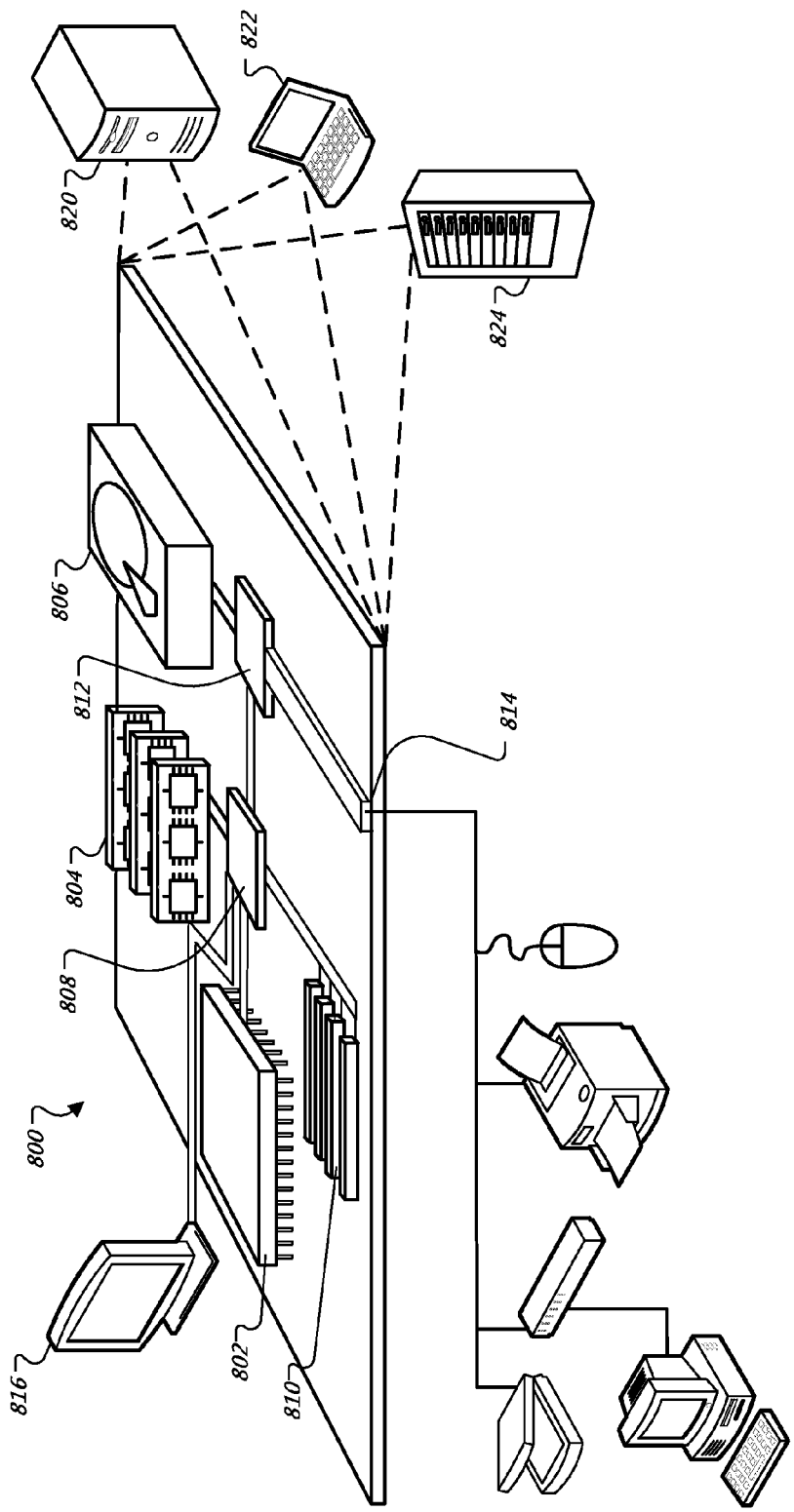
FIG. 8 is a block diagram of computing devices and systems.

FIG. 8 is a block diagram of computing devices that may be used and implemented to perform operations associated redefining portions of a navigation mesh with convex polygons. As such, the computing systems may provide operations similar to video game console or other type of video game platform. Computing device 800 can also represent various forms of digital computers, such as laptops, desktops, workstations, personal digital assistants, servers, blade servers, mainframes, and other appropriate computers.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and can be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses can be used, as appropriate, along with multiple memories and types of memory. Also, multiple computing devices 800 can be connected, with each device providing portions of the necessary operations (e.g., as a server bank, a group of blade servers, or a multi-processor system).

The memory 804 stores information within the computing device 800. In one implementation, the memory 804 is a computer-readable medium. In one implementation, the memory 804 is a volatile memory unit or units. In another implementation, the memory 804 is a non-volatile memory unit or units.

The storage device 806 is capable of providing mass storage for the computing device 700. In one implementation, the storage device 806 is a computer-readable medium. In various different implementations, the storage device 806 can be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 804, the storage device 806, memory on processor 802, or the like.

The high speed controller 808 manages bandwidth-intensive operations for the computing device 800, while the low speed controller 812 manages lower bandwidth-intensive operations. Such allocation of duties is exemplary only. In one implementation, the high-speed controller 808 is coupled to memory 804, display 816 (e.g., through a graphics processor or accelerator), and to high-speed expansion ports 810, which can accept various expansion cards (not shown). In the implementation, low-speed controller 812 is coupled to storage device 706 and low-speed expansion port 814. The low-speed expansion port, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 800 can be implemented in a number of different forms, as shown in the figure. For example, it can be implemented as a standard server 820, or multiple times in a group of such servers. It can also be implemented as part of a rack server system 824. In addition, it can be implemented in a personal computer such as a laptop computer 822. Alternatively, components from computing device 800 can be combined with other components in a mobile device (not shown).

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method comprising:
    identifying, by a computing device, one or more convex polygons being adjacent to a virtual object introduced into a virtual scene, wherein the one or more convex polygons define a navigable area within the virtual scene; and
    redefining, by the computing device, the one or more convex polygons adjacent to the virtual object to adjust the navigable area for the introduction of the virtual object, wherein redefining the one or more convex polygons adjacent to the virtual object includes replacing at least one convex polygon of the one or more convex polygons with a collection of convex polygons that include one or more new edges, and wherein redefining the one or more convex polygons uses one or more Boolean operations and allows edges of adjacent convex polygons of the collection of convex polygons to use unshared vertices so that a new edge of at least one convex polygon of the collection of convex polygons does not share a vertex with an adjacent new edge of at least one adjacent convex polygon of the collection of polygons.

2. The computer-implemented method of claim 1, in which the collection of convex polygons defines a non-navigable portion of the navigable area that represents the introduced virtual object.

3. The computer-implemented method of claim 1, in which each convex polygon in the collection of convex polygons is defined by two planes that represent adjacent sides of the virtual obstacle.

4. The computer-implemented method of claim 3, in which the two planes define an edge of at least one convex polygon in the collection of convex polygons.

5. The computer-implemented method of claim 1, in which the one or more Boolean operations include subtracting at least one convex polygon in the collection of convex polygons from one of the convex polygons adjacent to the virtual object.

6. The computer-implemented method of claim 1, in which the virtual scene is a portion of a virtual environment.

7. The computer-implemented method of claim 1, in which the identifying and redefining occurs when the virtual object is introduced into the virtual scene.

8. The computer-implemented method of claim 1, in which the identifying and redefining occurs when a virtual character enters the virtual scene.

9. A computer program product tangibly embodied in a non-transitory information carrier and comprising instructions that when executed by a processor perform a method comprising:
    identifying one or more convex polygons being adjacent to a virtual object introduced into a virtual scene, wherein the one or more convex polygons define a navigable area within the virtual scene; and
    redefining the one or more convex polygons adjacent to the virtual object to adjust the navigable area for the introduction of the virtual object, wherein redefining the one or more convex polygons adjacent to the virtual object includes replacing at least one convex polygon of the one or more convex polygons with a collection of convex polygons that include one or more new edges, and wherein redefining the one or more convex polygons uses one or more Boolean operations and allows edges of adjacent convex polygons of the collection of convex polygons to use unshared vertices so that a new edge of at least one convex polygon of the collection of convex polygons does not share a vertex with an adjacent new edge of at least one adjacent convex polygon of the collection of polygons.

10. The computer program product of claim 9, in which the collection of convex polygons defines a non-navigable portion of the navigable area that represents the introduced virtual object.

11. The computer program product of claim 9, in which each convex polygon in the collection of convex polygons is defined by two planes that represent adjacent sides of the virtual obstacle.

12. The computer program product of claim 11, in which the two planes define an edge of at least one convex polygon in the collection of convex polygons.

13. The computer program product of claim 9, in which the one or more Boolean operations include subtracting at least one convex polygon in the collection of convex polygons from one of the convex polygons adjacent to the virtual object.

14. The computer program product of claim 9, in which the virtual scene is a portion of a virtual environment.

15. The computer program product of claim 9, in which the identifying and redefining occurs when the virtual object is introduced into the virtual scene.

16. The computer program product of claim 9, in which the identifying and redefining occurs when a virtual character enters the virtual scene.

17. A system comprising:
    a computing device comprising:
        a memory configured to store instructions; and
        a processor configured to execute the instructions to perform a method comprising:
            identifying one or more convex polygons being adjacent to a virtual object introduced into a virtual scene, wherein the one or more convex polygons define a navigable area within the virtual scene; and redefining the one or more convex polygons adjacent to the virtual object to adjust the navigable area for the introduction of the virtual object, wherein redefining the one or more convex polygons adjacent to the virtual object includes replacing at least one convex polygon of the one or more convex polygons with a collection of convex polygons that include one or more new edges, and wherein redefining the one or more convex polygons uses one or more Boolean operations and allows edges of adjacent convex polygons of the collection of convex polygons to use unshared vertices so that a new edge of at least one convex polygon of the collection of convex polygons does not share a vertex with an adjacent new edge of at least one adjacent convex polygon of the collection of polygons.

18. The system of claim 17, in which the collection of convex polygons defines a non-navigable portion of the navigable area that represents the introduced virtual object.

19. The system of claim 17, in which each convex polygon in the collection of convex polygons is defined by two planes that represent adjacent sides of the virtual obstacle.

20. The system of claim 19, in which the two planes define an edge of at least one convex polygon in the collection of convex polygons.

21. The system of claim 17, in which the one or more Boolean operations include subtracting at least one convex polygon in the collection of convex polygons from one of the convex polygons adjacent to the virtual object.

22. The system of claim 17, in which the virtual scene is a portion of a virtual environment.

23. The system of claim 17, in which the identifying and redefining occurs when the virtual object is introduced into the virtual scene.

24. The system of claim 17, in which the identifying and redefining occurs when a virtual character enters the virtual scene.

25. A computer-implemented method comprising:
upon a virtual object being introduced into a virtual scene, identifying, by a computing device, a portion of a navigation mesh that is adjacent to the introduced object, wherein the navigation mesh represents an area navigable by a character within the virtual scene;
redefining, by the computing device, the portion of the navigation mesh adjacent to the introduced virtual object to include a navigable area portion defined by convex polygons and a non-navigable area portion that represents the location of the introduced virtual object, wherein redefining the portion of the navigation mesh includes replacing at least one convex polygon of the convex polygons defining the navigable area portion with a collection of convex polygons that include one or more new edges, and wherein redefining the portion of the navigation mesh includes using one or more Boolean operations and allowing edges of adjacent convex polygons of the collection of convex polygons to use unshared vertices so that a new edge of at least one convex polygon of the collection of convex polygons does not share a vertex with an adjacent new edge of at least one adjacent convex polygon of the collection of polygons; and
controlling the movements of the character within the virtual scene by allowing character movements within the navigable area portion and blocking character movements within the non-navigable area portion.

26. A computer program product tangibly embodied in a non-transitory information carrier and comprising instructions that when executed by a processor perform a method comprising:
upon a virtual object being introduced into a virtual scene, identifying a portion of a navigation mesh that is adjacent to the introduced object, wherein the navigation mesh represents an area navigable by a character within the virtual scene;
redefining the portion of the navigation mesh adjacent to the introduced virtual object to include a navigable area portion defined by convex polygons and a non-navigable area portion that represents the location of the introduced virtual object, wherein redefining the portion of the navigation mesh includes replacing at least one convex polygon of the convex polygons defining the navigable area portion with a collection of convex polygons that include one or more new edges, and wherein redefining the portion of the navigation mesh includes using one or more Boolean operations and allowing edges of adjacent convex polygons of the collection of convex polygons to use unshared vertices so that a new edge of at least one convex polygon of the collection of convex polygons does not share a vertex with an adjacent new edge of at least one adjacent convex polygon of the collection of polygons; and
controlling the movements of the character within the virtual scene by allowing character movements within the navigable area portion and blocking character movements within the non-navigable area portion.

27. A system comprising:
a computing device comprising:
a memory configured to store instructions; and
a processor configured to execute the instructions to perform a method comprising:
upon a virtual object being introduced into a virtual scene, identifying a portion of a navigation mesh that is adjacent to the introduced object, wherein the navigation mesh represents an area navigable by a character within the virtual scene;
redefining the portion of the navigation mesh adjacent to the introduced virtual object to include a navigable area portion defined by convex polygons and a non-navigable area portion that represents the location of the introduced virtual object, wherein redefining the portion of the navigation mesh includes replacing at least one convex polygon of the convex polygons defining the navigable area portion with a collection of convex polygons that include one or more new edges, and wherein redefining the portion of the navigation mesh includes using one or more Boolean operations and allowing edges of adjacent convex polygons of the collection of convex polygons to use unshared vertices so that a new edge of at least one convex polygon of the collection of convex polygons does not share a vertex with an adjacent new edge of at least one adjacent convex polygon of the collection of polygons; and
controlling the movements of the character within the virtual scene by allowing character movements within the navigable area portion and blocking character movements within the non-navigable area portion.

\* \* \* \* \*